(12) United States Patent
Lin

(10) Patent No.: US 9,169,991 B2
(45) Date of Patent: Oct. 27, 2015

(54) LENS AND BACKLIGHT MODULE HAVING THE LENS

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 127 days.

(21) Appl. No.: 14/018,427

(22) Filed: Sep. 5, 2013

(65) Prior Publication Data

US 2014/0177208 A1 Jun. 26, 2014

(30) Foreign Application Priority Data

Dec. 26, 2012 (TW) .................................. 101150270

(51) Int. Cl.
*F21V 5/04* (2006.01)
*F21V 5/00* (2015.01)
*G02B 19/00* (2006.01)
*F21Y 101/02* (2006.01)

(52) U.S. Cl.
CPC ................. *F21V 5/045* (2013.01); *F21V 5/002* (2013.01); *F21V 5/04* (2013.01); *G02B 19/0014* (2013.01); *G02B 19/0061* (2013.01); *F21Y 2101/02* (2013.01)

(58) Field of Classification Search
CPC ............ F21V 5/002; F21V 5/007; F21V 5/04; F21V 7/048; F21V 5/046; G02B 19/0061; G02F 1/133603; G02F 1/133611
USPC .......................................... 362/97.3, 310, 335
See application file for complete search history.

(56) References Cited

U.S. PATENT DOCUMENTS

| | | | |
|---|---|---|---|
| 8,100,549 B2* | 1/2012 | Matsuki et al. | 362/97.3 |
| 8,246,197 B2* | 8/2012 | Huang | 362/235 |
| 8,251,547 B2* | 8/2012 | Yamaguchi | 362/311.02 |
| 2006/0044806 A1* | 3/2006 | Abramov et al. | 362/337 |
| 2009/0067175 A1* | 3/2009 | Chen et al. | 362/255 |
| 2012/0319616 A1* | 12/2012 | Quilici et al. | 315/294 |

* cited by examiner

*Primary Examiner* — Peggy Neils
(74) *Attorney, Agent, or Firm* — Novak Druce Connolly Bove + Quigg LLP

(57) ABSTRACT

A lens includes an incident surface and a light output surface. A plurality of light diverging portions is arranged on the light output surface and around a center of the light output surface. The light diverging portions each are a ring and are spaced from each other. An inner light diverging portion has a refraction angle larger than that of an outer light diverging portion. Light emitted into the lens from the incident surface is diffused by the light output surface and the light diverging portions to radiate out of the lens. A cross section of each light diverging portion has a shape of a triangle. The present disclosure also relates a backlight module using the lens.

17 Claims, 6 Drawing Sheets

LENS AND BACKLIGHT MODULE HAVING THE LENS

BACKGROUND

1. Technical Field

The disclosure generally relates to lenses, particularly, to lenses employed in direct-type backlight modules, which can evenly diffuse light emitted from LED packages of the direct-type backlight module.

2. Description of Related Art

A typical backlight module includes a substrate, a plurality of light emitting diode (LED) packages arranged on the substrate, and a light diffusion board spaced from and located over the LED packages.

However, each LED package generates a smooth round light field, and the light emitted from the LED package is mainly concentrated at a center thereof. The light at a periphery of the LED package is relatively poor to illuminate. Therefore, the light emitted from the LED packages can not be uniformly emitted into the light diffusion board. When this happens, the performance of the backlight module will be unfavorably affected.

What is needed, therefore, is a lens and a direct-type backlight module having the lens which can overcome the above-described shortcomings.

DETAILED DESCRIPTION

An exemplary embodiment of a backlight module in accordance with the present disclosure will now be described in detail below and with reference to the drawings.

Figure 1:
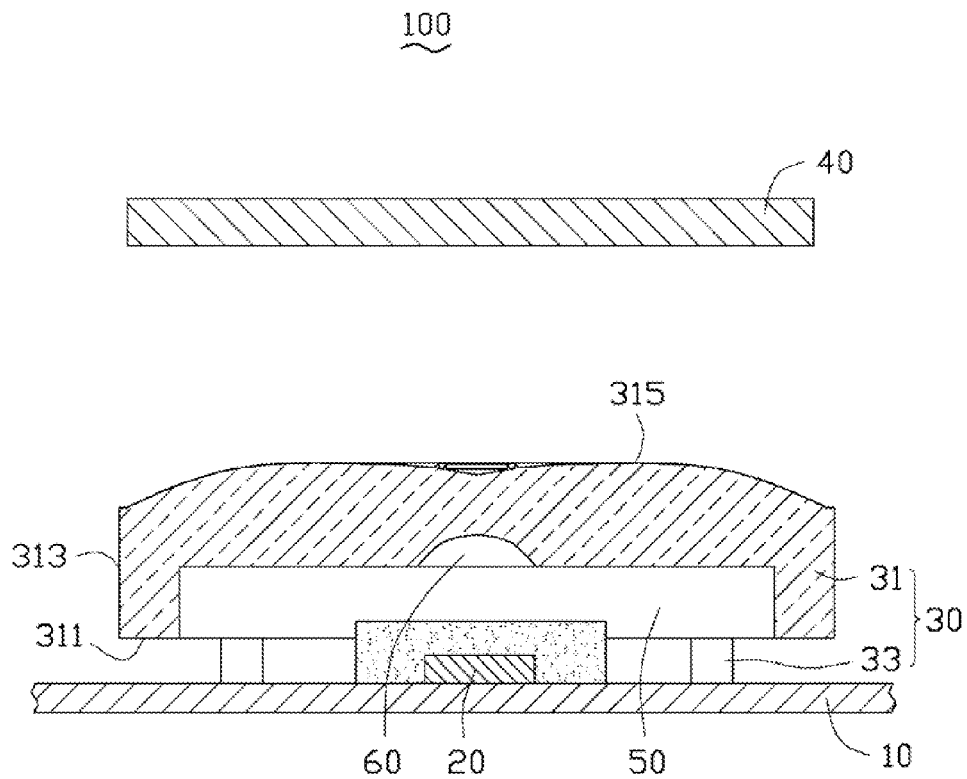
FIG. 1 is a schematic, assembled view of a backlight module in accordance with an exemplary embodiment of the present disclosure.

Referring to FIG. 1, a backlight module 100 in accordance with an exemplary embodiment is provided. The backlight module 100 can be used for illuminating a liquid crystal display (LCD, not shown).

The backlight module 100 includes a substrate 10, a lighting chip 20 mounted on a top surface of the substrate 10, a lens 30 covering the lighting chip 20, and a light diffusion board 40 located over and spaced from the lighting chip 20 and the lens 30. Light emitted from the lighting chip 20 is successively refracted by the lens 30 and the light diffusion board 40 to emit out uniformly. In this embodiment, the lighting chip 20 is a light emitting diode (LED), and the backlight module 100 is a direct-type backlight module 100.

The substrate 10 is a flat plate. A circuit (not shown) is arranged on the top surface of the substrate 10. In this embodiment, the substrate 10 is made of electrically insulating materials, such as silicone, epoxy or ceramic. The lighting chip 20 electrically connects with the circuit on the substrate 10.

The lens 30 is made of a transparent material with a good optical performance, such as PMMA (polymethyl methacrylate) or PC (Polycarbonate) plastic. The lens 30 is symmetrical with respect to a central axis O-O' line (as shown in FIG. 2) thereof.

Figure 2:
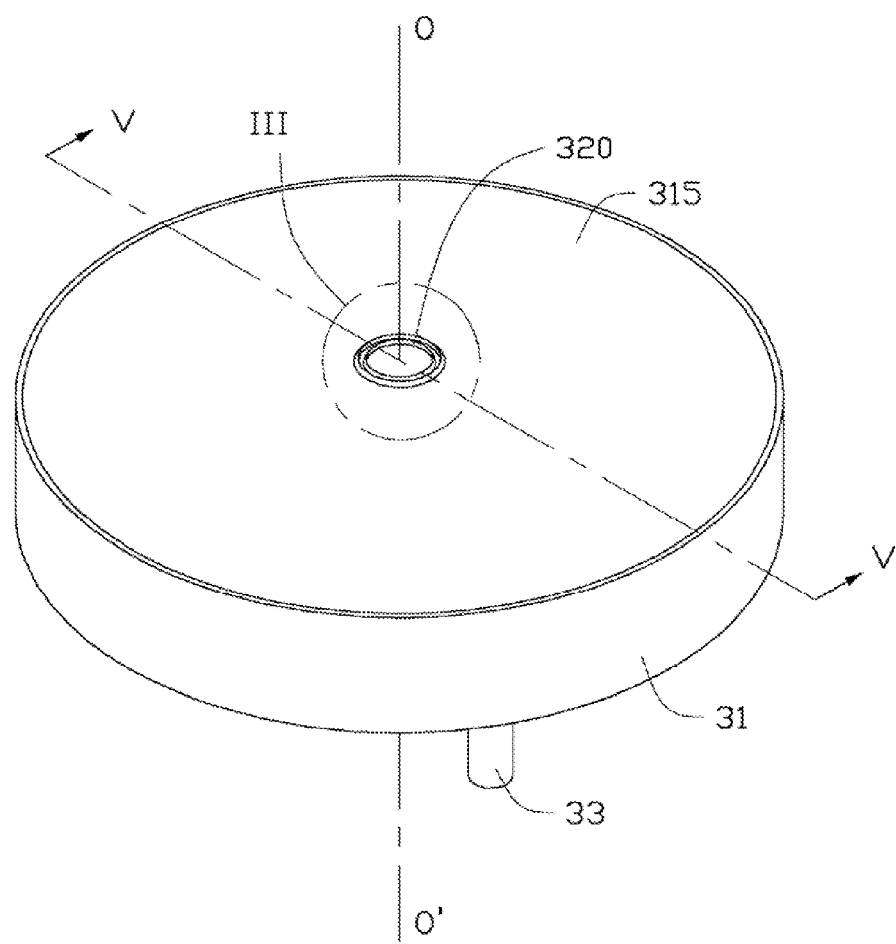
FIG. 2 is a perspective view of a lens of the backlight module of FIG. 1.
Figure 3:
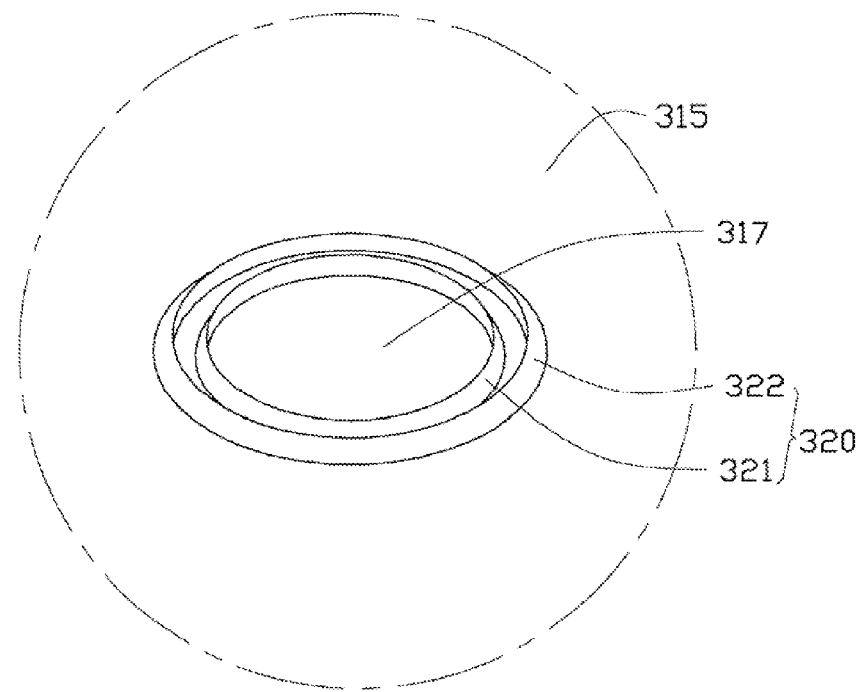
FIG. 3 is an enlarged view of a circled portion III of FIG. 2.
Figure 4:
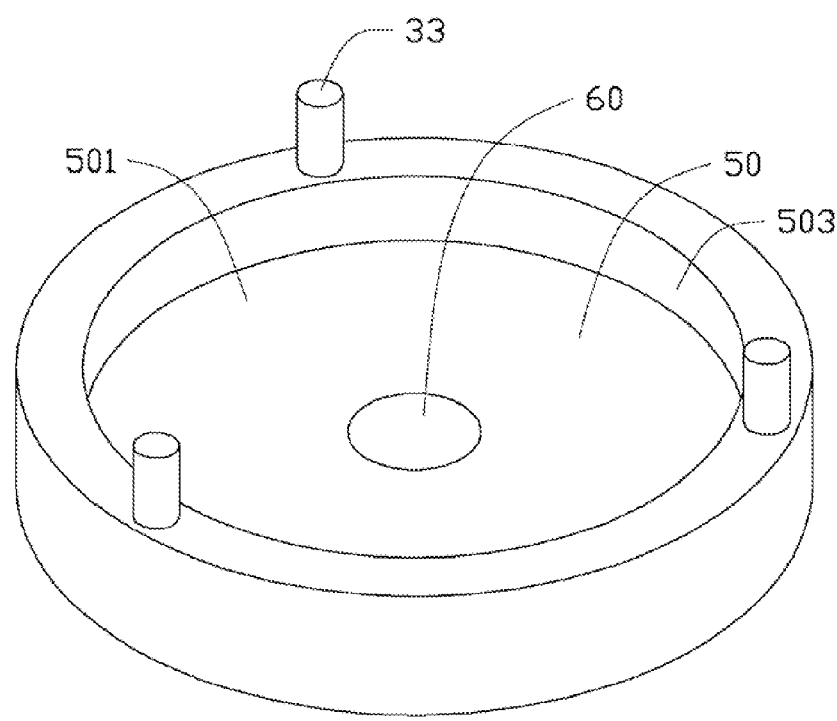
FIG. 4 is an inverted view of the lens of the backlight module of FIG. 2.

Referring to FIGS. 2-4, the lens 30 includes a light guiding portion 31 and a plurality of retaining portions 33 supporting the light guiding portion 31 on the substrate 10.

The light guiding portion 31 is columnar. The light guiding portion 31 includes a bottom surface 311, a top surface 315 and an annular side surface 313 interconnecting the bottom surface 311 and the top surface 315. In this embodiment, the top surface 315 functions as a light output surface of the lens 30.

The bottom surface 311 is a flat, circular surface. A cavity 50 is vertically recessed from a central portion of the bottom surface 311 along a direction toward the top surface 315 of the lens 30. The cavity 50 is defined by a circular upper surface portion 501 and an annular side surface portion 503 extending around and below the circular upper surface portion 501. The cavity 50 is coaxial with the lens 30. In this embodiment, the cavity 50 is also coaxial with the lighting chip 20. In other words, the central axis O-O' line of the lens 30 extends through centers of the lens 30, the cavity 50 and the lighting chip 20.

A recess 60 is defined in a central portion of the upper surface portion 501, and the recess 60 is coaxial with the lens 30. The recess 60 is recessed upwardly and aligned with the lighting chip 20. An inner surface of the recess 60 is arc-shaped, such that light emitted from the lighting chip 20 can be diffused by the arc-shaped inner surface of the recess 60 to radiate divergently into the light guiding portion 31 of the lens 30. In this embodiment, the inner surface of the recess 60 is recessed along a direction toward the top surface 315 of the lens 30 from the central portion of the upper surface portion 501 defining the cavity 50. In this embodiment, the upper surface portion 501 defining the cavity 50 and the inner surface defining the recess 60 cooperatively form a light incident surface of the lens 30.

The annular side surface 313 extends upwardly from the periphery of the bottom surface 311, and the top surface 315 is convex upwardly from the top end of the annular side surface 313 toward the central axis O-O' line.

A cross-sectional view of the top surface 315 has an approximately M-shaped (gull-wing shaped) configuration, such that a depression 317 is defined in a central portion of the top surface 315. The depression 317 is recessed inwardly towards the bottom surface 311 of the lens 30. The depression 317 is coaxial with the lens 30. In this embodiment, the depression 317 is in a form of a funnel.

The retaining portion 33 extends downwardly from the bottom surface 311 of the lens 30 to fix the light guiding portion 31 on the top surface of the substrate 10. The retaining portion 33 is located on the outer edge of the bottom surface 311. Each retaining portion 33 is cylindrical. In this embodiment, the number of the retaining portions 33 is three, and the three retaining portions 33 are located on vertices of an equilateral triangle, respectively.

A light diverging part 320 is formed in a central portion of the top surface 315 of the lens 30. The light diverging part 320 includes a plurality of light diverging portions protruding upwardly from the central portion of the top surface 315 of the lens 30. In this embodiment, the light diverging part 320 includes a first light diverging portion 321 and a second light diverging portion 322 protruding upwardly from the central portion of the top surface 315 of the lens 30.

The first and second light diverging portions 321, 322 are concentric rings, and surround a center of the depression 317 which is located at the central axis O-O' line. The second light diverging portion 322 is spaced from the first second light diverging portion 321, and is located surrounding an outer periphery of the first light diverging portion 321. An inner diameter of the second light diverging portion 322 is larger than that of the first light diverging portion 321. A refraction angle of the second light diverging portion 322 is less than that of the first light diverging portion 321. Alternatively, an inner diameter of each of the light diverging portions is gradually increased outward away from the central axis O-O' of the lens 30 along a top-to-bottom direction, and a refraction angle of each of the light diverging portions is gradually decreased along the top-to-bottom direction wherein the refraction angle of the second light diverging portion 322 is always less than that of the first light diverging portion 321.

Figure 5:
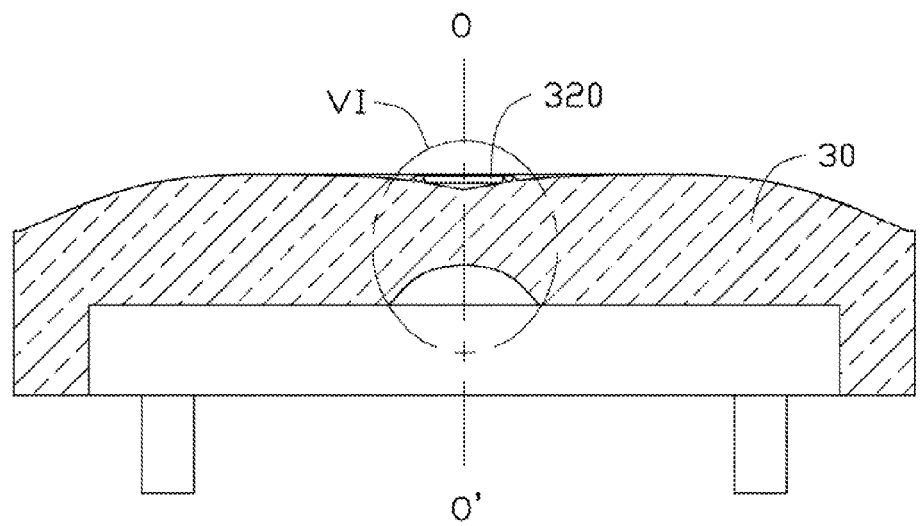
FIG. 5 is a cross-sectional view of the lens of FIG. 2, taken along a line V-V thereof.
Figure 6:
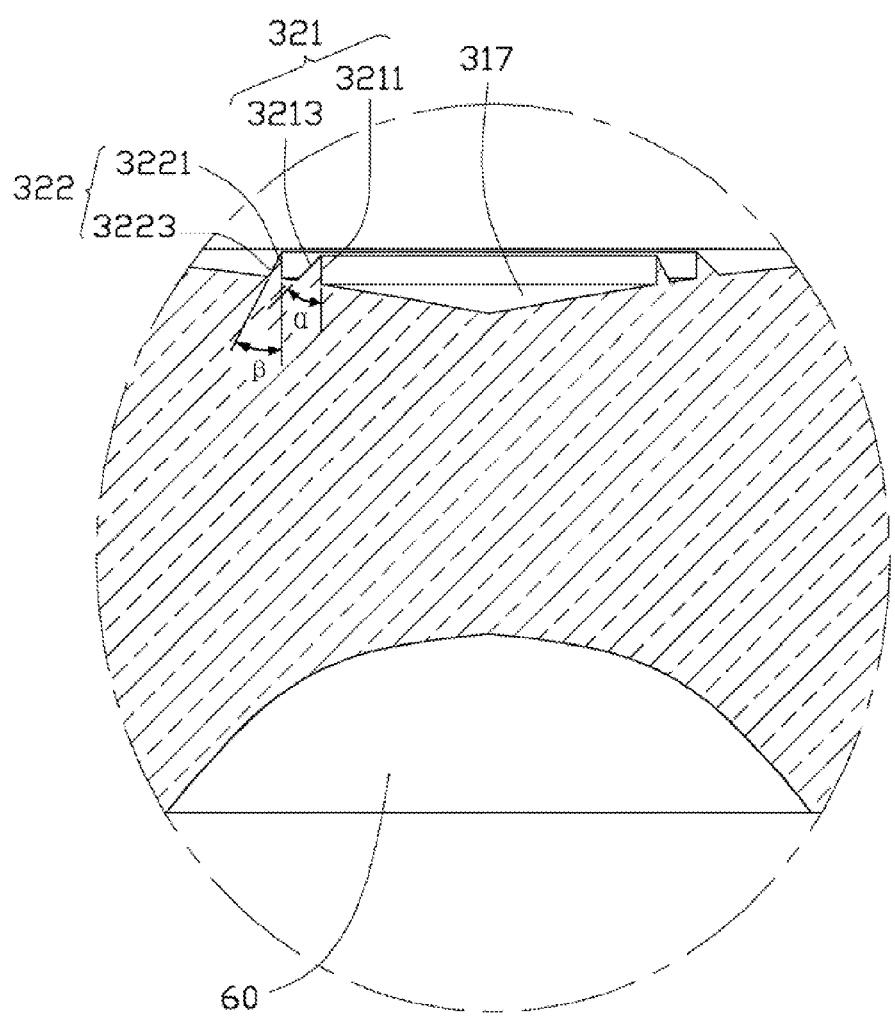
FIG. 6 is an enlarged view of a circled portion VI of FIG. 5.

Referring to FIGS. 5-6, a cross-section of the first diverging portion 321 is a trigulanar. A width of the first diverging portion 321 is decreased from a bottom end connecting the top surface 315 to a top end away from the top surface 315 of the lens 30.

The first light diverging portion 321 includes a first vertical surface 3211 and a first light diverging surface 3213 inclined from a top end of the first vertical surface 3211. The first vertical surface 3211 vertically extends upwardly from the top surface 315 of the lens 30, and is parallel with the central axis O-O'. In this embodiment, the first light diverging surface 3213 is inclined downwardly from the top end of the first vertical surface 3211, and is gradually increasingly spaced away from the central axis O-O' of the lens 30 along the top-to-bottom direction. An angle α is defined between the first vertical surface 3211 and the first light diverging surface 3213. The angle α is varied from 40 degrees to 60 degrees.

The second light diverging portion 322 has a similar cross-section as that of the first diverging portion 321. A width of the second diverging portion 322 is decreased from a bottom end connecting the top surface 315 to a top end away from the top surface 315 of the lens 30.

The second light diverging portion 322 includes a second vertical surface 3221 and a second light diverging surface 3223. The second vertical surface 3221 is parallel with the first vertical surface 3211. In this embodiment, the second light diverging surface 3223 is inclined downwardly from the top end of the second vertical surface 3221, and is gradually increasingly spaced from the central axis O-O' of the lens 30 along the top-to-bottom direction. An included angle β is defined between the second vertical surface 3221 and the second light diverging surface 3223. The included angle β is varied from 40 degrees to 60 degrees. In this embodiment, the included angle β is less than the included angle α. In this embodiment, the light diverging portions can be formed with the lens 30 as a single piece.

The light diffusion board 40 is a rectangular board. Light incident into the light diffusion board 40 can be diffused divergently to uniformly emit out. In this embodiment, the light diffusion board 40 is made of material with a high refractive index.

According to the backlight module 100 of the present disclosure, when the backlight module 100 is working, light emitted from the lighting chip 20 travels through the lens 30 from the upper surface portion 501 of the lens 30 defining the cavity 50 and the inner surface defining the recess 60, and the light is refracted by the top surface 315 and the light diverging part 320 on the top surface 315 to uniformly emit towards the light diffusion board 40.

In detail, light emitted from the lighting chip 20 is divergently refracted towards the top surface 315 of the lens 30 by the inner surface defining the recess 60. A part of the light with higher light intensity from the center of the lighting chip 20 emits into the first light diverging portion 321, and is refracted by the first light diverging portion 321 to the periphery of the top surface 315 of the lens 30. Another part of the light with lower light intensity from a periphery of the lighting chip 20 emits into the second light diverging portion 322, and is refracted by the second light diverging portion 322 to the periphery of the top surface 315 of the lens 30. Other part of the light which emits into the region of top surface 315 between the first and second light diverging portions 321, 322, is directly refracted by the top surface 315 to uniformly emit out of the lens 30.

Firstly, because the refraction angle of the first light diverging portion 321 is larger than the refraction angle of the second light diverging part 322, the part of light with higher light intensity is refracted more divergently by the first light diverging portion 321 than the part of light with lower light intensity refracted by the second light diverging portion 322, whereby the light refracted by the light diverging portion 320 is emitted uniformly towards the light diffusion board 40, which improves the performance of the backlight module 100.

Secondly, because the light diverging portions 321, 322 are spaced from each other, light reflected by the first and second vertical surfaces 3211, 3221 can be decreased, which makes more light can be refracted by the first and second light diverging surfaces 3213, 3223 and the top surface 315 of the lens 30, whereby a refracting efficiency of the first and second diverging parts 321, 322 and the top surface 315 is increased.

It is to be understood that the above-described embodiment is intended to illustrate rather than limit the disclosure. Variations may be made to the embodiment without departing from the spirit of the disclosure as claimed. The above-described embodiments illustrate the scope of the disclosure but do not restrict the scope of the disclosure.

What is claimed is:

1. A lens for use in a direct-type backlight module to spread light from a light source to a light diffusion board, comprising:
  a light incident surface located at a lower portion of the lens; and
  a light output surface located at an upper portion of the lens and opposite to the light incident surface, a depression aligned with the light source being defined in a central portion of the light output surface, a plurality of light diverging portions being arranged in the depression, the light diverging portions being protruded upwardly from a central portion of the light output surface and around the a central axis of the lens, refraction angles of the light diverging portions decreasing along a direction from the central axis of the lens toward a periphery of the lens, light travelling through the lens from the light incident surface being refracted by the light output surface and the light diverging portions to uniformly emit out;
  wherein each light diverging portion comprises a vertical surface extending upwardly from the light output surface and a light diverging surface inclined from a top end of the vertical surface towards the light output surface;
  wherein the light diverging surface of each light diverging portion is inclined downwardly and outwardly from the top end of the vertical surface toward the light output surface of the lens and along the direction from the central axis of the lens toward the periphery of the lens; and
  wherein an inclined angle is defined between the vertical surface and the light diverging surface of each light diverging portion, and the inclined angle of the light diverging portion near the center of the depression is larger than the inclined angle of another light diverging portion away from the center of the depression.

2. The lens of claim 1, wherein the light incident surface of the lens is coaxial with the light output surface of the lens.

3. The lens of claim 1, wherein the light diverging portions are a plurality of concentric rings.

4. The lens of claim 3, wherein the lighting diverging portions are spaced from each other.

5. The lens of claim 4, wherein a cross-section of each light diverging portion is triangular.

6. The lens of claim 2, wherein a cavity is recessed from the light incident surface towards the light output surface of the lens.

7. The lens of claim 6, wherein a recess is recessed outward from a central portion of an upper surface portion defining the cavity, and an inner surface of the recess is arc-shaped.

8. The lens of claim 1, wherein the light diverging portions are formed with the lens as a single piece.

9. A backlight module comprising:
a substrate;
a lighting chip mounted on the substrate; and
a lens covering the lighting chip, the lens comprising a light incident surface at a lower portion thereof and a light output surface at an upper portion thereof and opposite to the light incident surface, a depression aligned with the lighting chip being defined in a central portion of the light output surface, a plurality of light diverging portions being arranged in the depression, the light diverging portions being protruded upwardly from a central portion of the light output surface and around a center of the light output surface, a refraction angle of an inner light diverging portion being larger than a refraction angle of an outer light diverging portion, light travelling through the lens from the light incident surface being refracted by the light output surface and the light diverging portions to uniformly emit out; and wherein each light diverging portion has a vertical surface and a light diverging surface, a inclined angle is defined between the vertical surface and the light diverging surface, and a light diverging portion near the center of the depression has an inclined angle larger than that of another light diverging portion away from the center of the depression.

10. The backlight module of claim 9, wherein the lens further comprises a plurality of retaining portions extending downwardly from the light incident surface of the lens, and the retaining portions fix the lens on the substrate.

11. The backlight module of claim 10, wherein the number of the retaining portions is three, and the retaining portions are equidistantly spaced from each other.

12. The backlight module of claim 9, wherein the backlight module is a direct-type backlight module configured for directly illuminating a liquid crystal display.

13. The backlight module of claim 9, wherein each of the light diverging portions has a triangular shape in cross section.

14. The backlight module of claim 13, wherein the triangular shape has a vertical side near the center of light output surface and an inclined side away from the center of the light output surface.

15. The backlight module of claim 14, wherein the inclined side extends downwardly and outwardly from a top of the vertical side.

16. The backlight module of claim 14, where an inclined angle between the inclined side and the vertical side is between 40 to 60 degrees.

17. The backlight module of claim 16, wherein the inclined angle of the triangular shape of the inner light diverging portion is larger than the inclined angle of the triangular shape of the outer light diverging portion.

\* \* \* \* \*